US012628261B2

(12) United States Patent
Sprong

(10) Patent No.: US 12,628,261 B2
(45) Date of Patent: May 12, 2026

(54) OPERATING A FILAMENT OF AN X-RAY TUBE

(71) Applicant: KONINKLIJKE PHILIPS N.V., Eindhoven (NL)

(72) Inventor: Hans Peter Sprong, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 159 days.

(21) Appl. No.: 18/721,225

(22) PCT Filed: Dec. 16, 2022

(86) PCT No.: PCT/EP2022/086279
§ 371 (c)(1),
(2) Date: Jun. 18, 2024

(87) PCT Pub. No.: WO2023/117733
PCT Pub. Date: Jun. 29, 2023

(65) Prior Publication Data
US 2025/0056702 A1 Feb. 13, 2025

(30) Foreign Application Priority Data
Dec. 21, 2021 (EP) .................................... 21216304

(51) Int. Cl.
*H05G 1/34* (2006.01)
*H05G 1/32* (2006.01)

(52) U.S. Cl.
CPC ................. *H05G 1/34* (2013.01); *H05G 1/32* (2013.01)

(58) Field of Classification Search
CPC .. H05G 1/34; H05G 1/32; H05G 1/20; H05G 1/46; H05G 1/08; H05G 1/10; A61B 6/40; A61B 6/54; H01J 35/064; H01J 35/22
See application file for complete search history.

(56) References Cited

U.S. PATENT DOCUMENTS 4,107,531 A * 8/1978 Garratt ................. A61B 6/0435 378/16
7,224,770 B2 5/2007 Spahn
2020/0146135 A1 * 5/2020 Tetsuka .................. A61B 6/542

FOREIGN PATENT DOCUMENTS

CA 1193751 A 9/1985
JP 2007059233 A 3/2007
(Continued)

OTHER PUBLICATIONS

International Search report and Written Opinion of PCT/EP2022/086279, dated May 25, 2023.

*Primary Examiner* — Kiho Kim

(57) ABSTRACT

The present invention relates to operating a filament of an X-ray tube. In order to provide X-ray tubes with improved wear out, a control device (10) for pulsed operation of a generator for an X-ray tube is provided. The X-ray tube may be controlled to provide a plurality of X-ray pulses, wherein two subsequent pulses are temporally separated by an emission pause. The emission pause comprises at least a first part and a second part. A filament current is provided to a cathode filament of the X-ray tube such that, in the emission pause between two subsequent pulses, during a first part of the pause a first filament current is provided and during a second part of the pause a second filament current is provided, the first filament current being lower than the second filament current. By operating the filament in this way, the filament temperature can be reduced, resulting in significantly less wear and longer lifetime of the X-ray tube.

20 Claims, 7 Drawing Sheets

(56) References Cited

FOREIGN PATENT DOCUMENTS

| | | | |
|---|---|---|---|
| JP | 2015216036 | A | 12/2015 |
| WO | 2020193103 | A1 | 10/2020 |

* cited by examiner

OPERATING A FILAMENT OF AN X-RAY TUBE

CROSS-REFERENCE TO PRIOR APPLICATIONS

This application is the U.S. National Phase application under 35 U.S.C. § 371 of International Application No. PCT/EP2022/086279, filed on Dec. 16, 2022, which claims the benefit of European Patent Application No. 21216304.2, filed on Dec. 21, 2021. These applications are hereby incorporated by reference herein.

FIELD OF THE INVENTION

The present invention relates to operating a filament of an X-ray tube and relates in particular to a control device for pulsed operation of a generator for an X-ray tube, to a generator for voltage supply of an X-ray tube, to an X-ray imaging system and to a method for operating a generator of an X-ray tube in a pulsed manner.

BACKGROUND OF THE INVENTION

X-ray imaging is considered an important imaging modality in medical imaging. X-ray tubes are used to generate X-ray radiation that passes through a subject and impinges on an X-ray detector. For various reasons, for example restrictions in certain flat X-ray detectors, X-ray radiation may need to be generated in a pulsed manner. In such pulsed X-ray image acquisition, X-ray images are acquired using a series of short X-ray pulses. Such a series of pulses is called an imaging run.

A crucial part in an X-ray tube are the cathode filaments. The filaments need to have a specific, elevated temperature to reach the desired emission current during an X-ray pulse. X-ray tubes used e.g. in cardio-vascular X-ray systems may show a wear-out of their cathode filaments. The wear-out may be the result of evaporation of the tungsten they consist of.

SUMMARY OF THE INVENTION

There may thus be a need to provide X-ray tubes in particular for pulsed operation with increased field life.

The object of the present invention is solved by the subject-matter of the independent claims: further embodiments are incorporated in the dependent claims. It should be noted that the following described aspects of the invention apply also for the control device for operation of a generator for an X-ray tube, for the generator for voltage supply of an X-ray tube, for the X-ray imaging system and for the method for operating a generator of an X-ray tube.

According to an embodiment, a control device for pulsed operation of a generator for an X-ray tube is provided. The control device comprises a data input and a controller. The data input is configured to provide a signal for an X-ray imaging run comprising a plurality of X-ray pulses for acquiring at least one X-ray image. The controller is configured to control the generator to provide a filament current to generate heat in a filament of a cathode of the X-ray. The generator is configured to provide the plurality of X-ray pulses, whereby each two subsequent pulses of the plurality of X-ray pulses are temporally separated by an emission pause. The emission pause comprises at least a first part and a second part. For providing the filament current, the controller is further configured to control the generator to adjust, in the emission pause between the two subsequent pulses, the filament current thus providing at least a first filament current during the first part of the pulse and a second filament current for the second part of the pause. The first filament current is lower than the second filament current.

In a preferred embodiment, wherein the controller is configured to provide the filament current at an operational level during an X-ray pulse, the first filament current is lower than the operational level and/or the second filament current is higher than the operational level. In accordance therewith, providing the first filament current is also referred to as "blanking" and providing the second filament current is also referred to as "boosting" hereinafter.

Thus, in effect, during the first part of the emission pause, the filament temperature decreases from its operational value and the second filament current may be provided as an intermediate heat-up current to restore the temperature of the filament to its operational value during the second part of the emission pause. That is, the operational value of the filament temperature corresponds to the temperature needed for emitting an electron beam during an X-ray pulse.

By operating the filament in this way, during pulsed operation of the X-ray tube, the filament temperature between pulses will be lower than it would be when the filament current was kept continuously at an operational level, thus causing significantly less wear, without interfering with the quality of the X-ray beam or other noticeable effects. As an effect, the filament is subject to lower temperatures between pulses, resulting in less tungsten evaporation and thus reduced wear.

According to an example, the controller is configured to control the generator such that the first and the second filament currents are repeatedly applied during at least a part of the emission pauses, resulting in a repeated cooling-down and heating-up of the filament during pulsed operation of the X-ray tube.

In an example, the cooling-down and heating-up of the filament is provided during each emission pause between each two subsequent pulses of the plurality of X-ray pulses.

In an alternative example, the cooling-down and heating-up of the filament is provided during a subset of emission pauses, for example in a plurality of pauses after a predetermined number of pauses have occurred with no or at least reduced degree of blank/boost activation.

According to an example, the controller is configured to control the generator such that the duration of the first portion and the duration of the second portion are determined based on a calculation weighting results from a boost curve and results from a blank curve to retrieve blank time and boost time within a given pulse pause duration while still reaching the operational filament temperature during the pulses.

For example, the boost and blank time added-up are less than or equal to the pause duration and at the end of the pause the operational current needs to be reached.

In an example, the controller is configured to control the generator such that the duration of the first portion and the duration of the second portion are determined based on the calculation weighting results from the boost curve and results from the blank curve to retrieve maximum blank time and maximum boost time for a given pulse pause duration while still reaching the operational filament temperature at the start of the next pulse.

It is noted that, in an example, both blank and boost are provided to be maximum in the sense that they fit exactly inside each pause while still reaching the operational current when the next pulse of the imaging run starts. They can both be shorter, but in that case the filament will be heated longer at the operational level being less optimal.

It is noted that, the length of the first part and the length of the second part are not independent; accurate blank and boost curves are taken as the basis to calculate the optimal switching point. The temperature decrease during the first part needs to be compensated by the temperature increase during the second part (unless the generator is regulating to another voltage/emission current set-point). The blank and boost curves predict how much time is needed for blanking and boosting to achieve this with the blank and the boost current chosen as first and second filament current.

According to an example, to generate the electron beam with the desired emission current for generating the X-ray pulses of the imaging run, the controller is configured to control the generator to provide a plurality of voltage pulses corresponding to the X-ray pulses. In addition, or alternatively, the controller is configured to to repeatedly open an electric-field based restraining device, each opening of the device corresponding to one of the plurality of X-ray pulses.

According to an example, the controller is configured to control the generator such that a current during the first part of the pause is sufficient to provide that a predetermined minimal current is maintained as effective current throughout the pause.

According to a further aspect, also a generator for pulsed voltage supply of an X-ray tube is provided. The generator comprises, as generator components, a control device according to one of the preceding examples, an electric power input, an electric transformer arrangement and an electric power output. The electric power input is connectable to an electric power supply configured to provide an input in form of electric energy for operating the X-ray tube; and wherein the electric power supply is connected to the electric transformer arrangement. The electric transformer arrangement is configured to transform the electric input into suitable DC high-voltage and suitable electric current for pulsed operation of the X-ray tube. The electric power output is configured to provide the suitable high-voltage and the suitable electric currents. The electric power output is connectable to the X-ray tube. Furthermore, the control device is configured to control said generator components.

According to a further aspect, an X-ray imaging system is provided. The system comprises an X-ray tube for generating X-ray radiation, a control device according to one of the examples above, and a generator for voltage supply of the X-ray tube according to the preceding example. The X-ray tube comprises an anode and a cathode. The cathode comprises at least one cathode filament for emitting at least one electron beam towards the anode. The control device controls a pulsed operation of the cathode filament by controlling the electric transformer arrangement of the generator.

According to a further aspect, also a method for operating a generator of an X-ray tube in a pulsed manner is provided. The method comprises the following steps:

- providing a signal for an X-ray imaging run comprising a plurality of X-ray pulses for acquiring at least one X-ray image;
- providing a filament current to generate heat in a filament of a cathode of the X-ray tube to reach a desired emission current during an X-ray pulse; and
- generating an electron beam with a desired emission current from the cathode towards an anode of the X-ray tube under the influence of a voltage between the anode and the cathode to generate the plurality of X-ray pulses with desired properties.

For providing the filament current, it is provided the steps of:

- providing a plurality of pulses to generate the electron beam with the desired emission current for generating the plurality of X-ray pulses, wherein two subsequent pulses of the plurality of pulses are temporally separated by an emission pause; wherein the emission pause comprises at least a first part and a second part; and
- adjusting, in the emission pause between the two subsequent pulses, the filament current thereby providing a first filament current for the first part of the pause and a second filament current for the second part of the pause.

The first filament current is lower than the second filament current. Preferably, the first filament current is too low to maintain the filament temperature to reach the desired emission current of the electron beam, and the second filament current is provided as an intermediate heat-up current to prepare the filament for the desired emission current of an electron beam for the following X-ray pulse.

According to an aspect, a controlling of the energy supply of the filament for an X-ray tube is provided which provides a stepped current for heating the filament in order to reduce wear during operation of the X-ray tube. The stepped current is applied during a pause between two consecutive X-ray pulses. In a first part, a lower current i.e. the first filament current is provided, for example a current that is just enough to ensure sufficient energy being supplied to the tube's other components. This lower current allows the filament to cool down. The lower current thus provides a blank (in particular regarding the filament temperature). In a second part, a higher current is provided to heat up the cathode filament to the required temperature necessary for, during the subsequent X-ray pulse, emitting electrons towards the anode of the X-ray tube and thereby generating the X-ray radiation. This higher current allows the filament to heat up in a fast manner. The higher current thus provides a boost (in particular regarding the filament temperature).

Preferably, regardless of whether the cooling down or the heating-up period is larger, during the pulse pause, the temperature of the filament is lower during this period than when the operational filament current had been maintained.

In an example, between pulses, the temperature of the filament drops to a value that is as low as possible yet the filament is brought back to its operational temperature in time for the next pulse.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
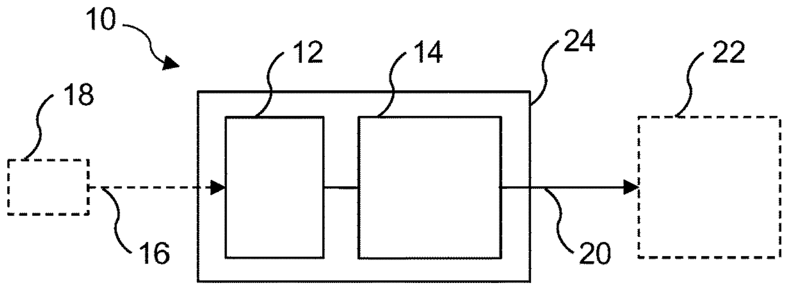
FIG. 1 schematically shows an example of control device for operation of a generator for an X-ray tube.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

In thermionic X-ray tubes, electrons emitted by a heated cathode are accelerated through a strong electric field in vacuum towards an anode where they generate "bremsstrahlung" also known as X-rays in case they are generated by an X-ray tube. The amount of X-ray is proportional to the emission current running between anode and cathode. Apart from cathode surface size, surface conditions and material, which are "fixed" in a particular tube design, the emission current is a function of the voltage between cathode and anode and the temperature of the cathode. Cathodes are usually strips or coils of a metal with a high melting point, such as Tungsten, called filaments. When they are heated, the metal of the filaments evaporates and eventually the filament gets so thin at a certain location that it breaks. This describes a general wear mechanism for thermionic X-ray tubes.

For imaging, X-ray tubes may be operated in pulsed mode. Rather than producing a constant amount of X-ray, they produce short pulses of high intensity in series called imaging runs. This mode of operation supports detectors that may need a reset time where there is no X-ray produced between two imaging frames. Further, with short intense pulses there is less blurring of the image by movement.

Based on the type of procedure and e.g. the X-ray retention experienced in previous images, settings for tube voltage, emission current and pulse width are determined. At that point in time the filament is kept on stand-by temperature by passing a stand-by filament heating current through it. This current may be somewhere between 2 and 3 A. Based on the desired setpoints for tube voltage and emission current, an operational filament current can be determined for example through interpolation using a look-up table called the static adaptation table in which the relationship between filament current, the tube voltage and the resulting emission current was recorded. The operational filament current may lay somewhere between 4 and 6 A. Then, by interpolating a table called the boost table, the "boost time" needed to "boost" the filament temperature from stand-by to the operational temperature is determined. At the beginning of the run a boost current of typically around 8 A is run through the filament to quickly heat it up to the operational temperature after which the operational filament heating current is applied. If there is no change to the setpoints, this current will remain the same over the duration of the run. Also, an "idle-blank time" is determined through interpolation of the blank table. After the run, an idle-blanking current of about 1 to 1.5 A is applied to again quickly let the filament temperature drop to the stand-by temperature.

Because the filaments wear (evaporate), their resistance changes over time, which means that the recorded static adaptation table and the boost and blank tables become less accurate over time. Because of this, an automatic adjustment of the adaptation table to compensate for filament wear is provided that is updated after every run. This eliminates the need for adaptation procedures after an initial one during the lifetime of a tube, for the X-ray generators in which this method is implemented. The method continuously corrects the values obtained from the static adaptation table and the boost and blank tables to remain accurate over the entire tube life in the field.

FIG. 1 schematically shows an example of control device 10 for operation of a generator for an X-ray tube. The control device 10 comprises a data input 12 and a controller 14. The data input 12 is configured to provide a signal for an X-ray imaging run comprising a plurality of X-ray pulses for acquiring at least one X-ray image. The controller 14 is configured to control the generator to provide a filament current to generate heat in a filament of a cathode of the X-ray tube. This causes the generator to generate an electron beam with a desired emission current from the cathode towards an anode of the X-ray tube under the influence of a tube voltage between the anode and the cathode to generate the X-ray pulse with desired properties.

The controller 14 is configured to control the X-ray tube to provide a plurality of pulses to generate the electron beam with the desired emission current for generating the plurality of X-ray pulses, wherein two subsequent pulses of the plurality of pulses are temporally separated by an emission pause. That is, during the pulses, the filament current provided corresponds to a normal operational current level that, at the corresponding tube voltage, results in emitting an electron beam at the desired emission current from the cathode towards the anode.

The emission pause comprises at least a first part and a second part. The controller 14 is further configured to control the generator to adjust, in the emission pause between the two subsequent pulses, the filament current providing a first filament current during the first part of the pause and a second filament current during the second part of the pause. The first filament current is lower than the second filament current and preferably also lower than the operational current level. In effect, the first filament current is too low to maintain the filament at a temperature needed for emitting an electron beam. As a result, the filament temperature decreases during the first part of the emission pause.

Preferably, the second filament current is provided as an intermediate heat-up current to prepare the filament for subsequently emitting the desired emission current of an electron beam during the following X-ray pulse. Preferably, the second filament current is higher than the operational current level. Thus, at the beginning of the following pulse, the temperature of the filament may be restored to its operational value needed for emitting the electron beam.

In accordance herewith, providing the first and second filament current i.e. blanking and boosting are implemented in between subsequent pulses within an imaging run, in order to save filament wear. That is, a current provided to the filament of the X-ray tube is firstly reduced in between subsequent pulses of the imaging run to the first filament current, causing the filament to cool down. Shortly before the next pulse, an increased boosting current is used as the second filament current so that the filament is back at the operating temperature at the start of the pulse. This is repeated throughout the pulsed imaging run, preferably in between each two adjacent X-ray pulses.

A first arrow indicates a supply of the signal to the control device 10, for example from a user interface 18. A second arrow indicates the provision of the control commands, signals, or the like of the controller 14, for example to an X-ray imaging apparatus 22. A frame 24 indicates the option of arranging the data input 12 and the controller 14 in a common structure or housing. However, they can also be arranged in a separate manner.

The controller 14 can also be referred to as data processor.

In an example, the controller 14 is configured to control the generator to adjust the filament current, in the pulse pause between two subsequent pulses, providing a further filament current for a further part of the pause. In an example, the further filament current is provided following the second filament current, wherein the further filament current is lower than the second filament current. In a further other option, the further filament current is higher than a current during the first part of the pause.

In an option, not shown in detail, the controller 14 is configured to control the generator such that a first filament current is provided for the first part of the pause. The first filament current is lower than the second filament current.

In an example, the first filament current is as low as 0 A, e.g. no current at all.

The provision of a lower current than the operational current for a portion of the part between pulses results in a lower temperature of the filament for the pause between two pulses leading to lower wear of the filament. As the lower current also leads to lower temperature, a cooling effect is thus provided. This is also referred to as intercooler or intercooling scheme.

As an effect, by reducing the time during which operational current is provided in the filament continuously during the entire imaging run, the wear, or wearing out, of the filament can be reduced. It has been shown that a reduction of the current by 2/10 A can result in approximately twice the lifetime. The increase of the current by 2/10 A can result in approximately half the lifetime.

In other words, a stand-by current is applied outside the runs, a boost current is applied preparing a run, an operational current is applied during a pulse, and a blank current is used after the run. The first filament current is applied after a pulse and the second filament current is applied before a following pulse. During pulses the operational current is applied, followed by the first filament current, then the second filament current and back to the operational current for the next pulse. Preferably the first and second filament currents are applied in between each two subsequent pulses of the plurality of X-ray pulses of the imaging run. However, in accordance herewith, alternative schemes may be envisaged, whereby the first and second filament currents are applied during certain emission pauses but not during others, for example in an alternating manner.

In an example, in a very long pause between two pulses, a further filament current approximately equal to the stand-by current is provided between the first and the second filament current.

With this scheme in mind, the second filament current goes to operational current: the correct operational current is lower than second filament current. The second filament current is not be followed by the first filament current or a current lower than the first filament current, but the first filament current can be followed by stand-by current, which is higher than the first filament current.

In such variations, if the first filament current does not equal the "blank" current used to return the filament to stand-by temperature or if the second filament current does not equal the "boost" current to heat the filament from stand-by to operational temperature, different "boost" and/or "blank" curves need to be used for determining the duration of the first and last portion of the pause.

In an example, the second filament current is provided for a second or a third part of the pause. It is noted that the pause may show other, i.e. more parts. In an example, a further part is arranged between the first and the second part.

In another option, not shown in detail, the controller 14 is configured to control the generator such that the application during the first part of the pause and of the second filament current results in a cooling-down and heating-up of the filament during each pause.

In an example, the controller 14 is configured to control the generator such that the first filament current is provided for a first portion of the pause and the second filament current is provided for a second portion of the pause.

In an example, the first portion is larger than the second portion.

In an example, the second portion is larger than the first portion.

In another example, the first portion is equal to the second portion.

In a further option, not shown in detail, the controller 14 is configured to control the generator such that the duration of the first portion and the duration of the second portion are maximized based on a calculation weighting results from a boost curve and results from a blank curve to retrieve blank time and boost time for a given pulse pause duration while still reaching the operational filament temperature during the pulses.

In a still further option, also not shown in detail, the controller 14 is configured to control the generator such that the blank curve and the boost curve are interpolated from look-up tables.

In an option, not shown in detail, the look-up tables are updated based on a detected wear of the filament. In an option, in addition or alternatively, the results from the look-up table are corrected for the detected wear of the filament.

In another option, not shown in detail, to generate the electron beam with the desired emission current for generating the X-ray pulses, the controller 14 is configured to control the generator to provide at least two voltage pulses. Alternatively, or in addition, the controller 14 is configured to open an electric-field based restraining device twice.

For example, the electric-field based restraining device is provided as a grid switch.

In an example, pulses are generated through magnetic fields.

In an option, not shown in detail, the controller 14 is configured to control the generator such that after the second filament current, an operational filament current is provided during the pulse.

In an example, the controller 14 is configured to control the generator such that a transition from the second filament current to the operational filament current is provided just before the emission pulse of the emission current is generated.

In an example, the controller 14 is configured to control the generator such that after the second filament current, an operational filament current is provided before the voltage pulse for the emission current is generated.

In an example, the controller 14 is configured to control the generator such that a plurality of sequences of pulses is provided for a plurality of images, and each pulse within a sequence is separated from the preceding/subsequent pulse by a pulse pause in which the first filament current and the second filament current are provided consecutively or interrupted by the stand-by filament current in case of very long pauses. Further, the sequence of pulses is followed by an idle time before a further imaging sequence is provided, wherein, at least during a part of the idle time, an idle filament current is provided. Still further, at the beginning of this idle time, a first idle filament current is provided to let the filament cool down to the stand-by temperature, after which a second idle filament current is provided during the remainder of the idle time to maintain the stand-by temperature (the stand-by current). As an option, the second idle filament current is higher than the first filament current and chosen such that the heating-up time to operational temperature is as short as possible, but no thermionic emission takes place at the highest operational voltage between anode and cathode.

In an example, the first idle filament current is provided as the first filament current. The first idle filament current can then be referred to as first filament current, and the second idle filament current is referred to as stand-by filament current.

The plurality of images is also referred to as a sequence of images.

In an option, not shown in detail, the controller 14 is configured to control the generator such that a heat-up filament current is provided before a sequence of pulses is provided. The heat-up filament current can be equal to the second filament current.

In an example, the heat-up filament current is approximately equal to the second filament current.

In an option, not shown in detail, the controller 14 is configured to control the generator such that a current during the first part of the pause is sufficient to provide that a predetermined minimal current is maintained as effective current throughout the pause.

In an example, the first filament current is sufficient to provide that a predetermined minimal current is maintained as effective current throughout the pause.

In an example, a sequence of pulses is followed by an idle time before a further imaging sequence is provided. The controller is configured to control the generator such that an idle filament current is sufficient to provide that a predetermined minimal current is maintained as effective current throughout the pause.

In an example, the first filament current and the idle filament current are the lowest currents in the mechanism; all other currents are higher. The approach is to make sure that there is enough current to maintain the grid switch electronics that are inside the X-ray tube.

For tubes without a grid switch, first filament current, and also the idle filament current, can be 0 A.

In an example, the controller 14 is configured to control the generator such that the first filament current and the second filament current are provided with such parameters that a predetermined minimal current is maintained as effective current throughout the pause. The parameters comprise the filament current value and the duration time of the first and second filament current.

Figure 2:
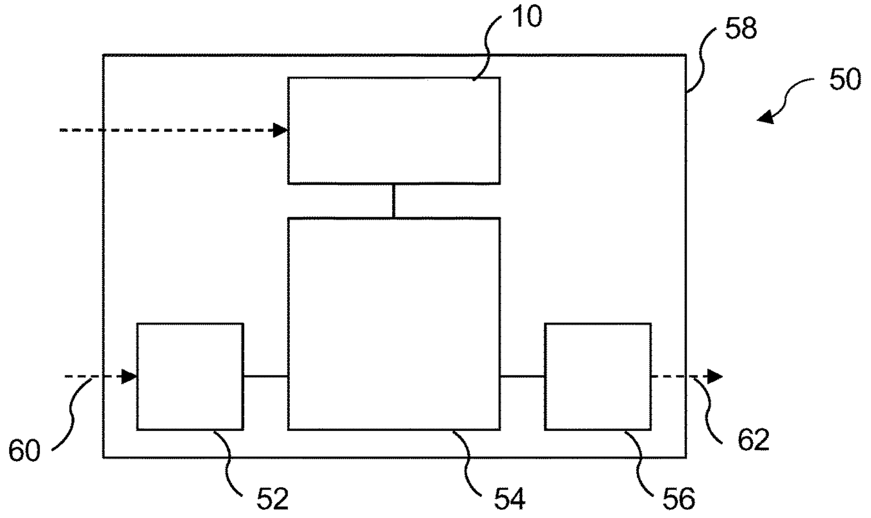
FIG. 2 schematically shows an example of a generator for voltage supply of an X-ray tube.

FIG. 2 schematically shows an example of a generator 50 for pulsed voltage supply of an X-ray tube. The generator 50 comprises an example of the control device 10 according to one of the preceding examples. Further, an electric power input 52, an electric transformer arrangement 54 and an electric power output 56 are provided. The electric power input 52 is connectable to an electric power supply configured to provide an input in form of electric energy for operating the X-ray tube. The electric power input 52 is connected to the electric transformer arrangement 54. The electric transformer arrangement 54 is configured to transform the voltage input into suitable DC high-voltage and suitable electric current for pulsed operation of the X-ray tube. The electric power output 56 is configured to provide the suitable high-voltage and the suitable electric currents. The electric power output 56 is connectable to the X-ray tube. The control device 10 is configured to control said generator components, e.g. the electric transformer arrangement 54.

A frame 58 indicates the option of arranging the control device 10, the electric power input 52, the electric transformer arrangement 54 and the electric power output 56 in a common structure or housing. However, they can also be arranged in a separate manner. A first arrow 60 indicates the signal supply. A second arrow 62 indicates the electric output.

Figure 3:
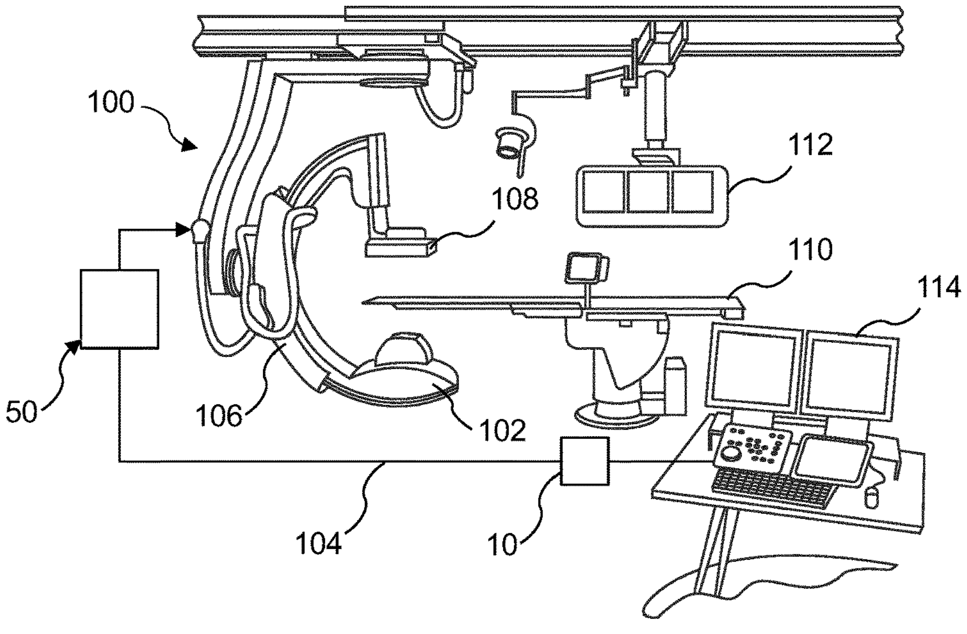
FIG. 3 schematically shows an example of X-ray imaging system.

FIG. 3 schematically shows an example of X-ray imaging system 100. The X-ray imaging system 100 comprises an X-ray tube 102 for generating X-ray radiation. Further, the X-ray imaging system 100 comprises an example of the control device 10 according to one of the preceding examples, and an example of the generator 50 for voltage supply of the X-ray tube according to the preceding example. The X-ray tube 102 comprises an anode and a cathode (not shown in detail). The cathode comprises at least one cathode filament for emitting at least one electron beam towards the anode. The control device 10 controls an operation of the cathode filament by controlling the electric transformer arrangement 54 of the generator 50.

As an example, the X-ray tube 102 is mounted to an end of a C-arm 106, which is equipped with a detector 108 at the other end. A subject support 110 is shown. Further, a display arrangement 112 is indicated near the subject support 110. C-arm and other equipment can be mounted to ceiling support structures. A console 114 with mouse, keypad, tablet, and control knobs plus displays for actively controlling the X-ray imaging system 100 is shown in the lower right foreground in FIG. 3. A connection line 104 indicates the data connection of the console 114 with the control device 10 and the generator 50.

In an example, the cathode comprises of two cathode filaments for emitting electron beams towards the anode.

Figure 4:
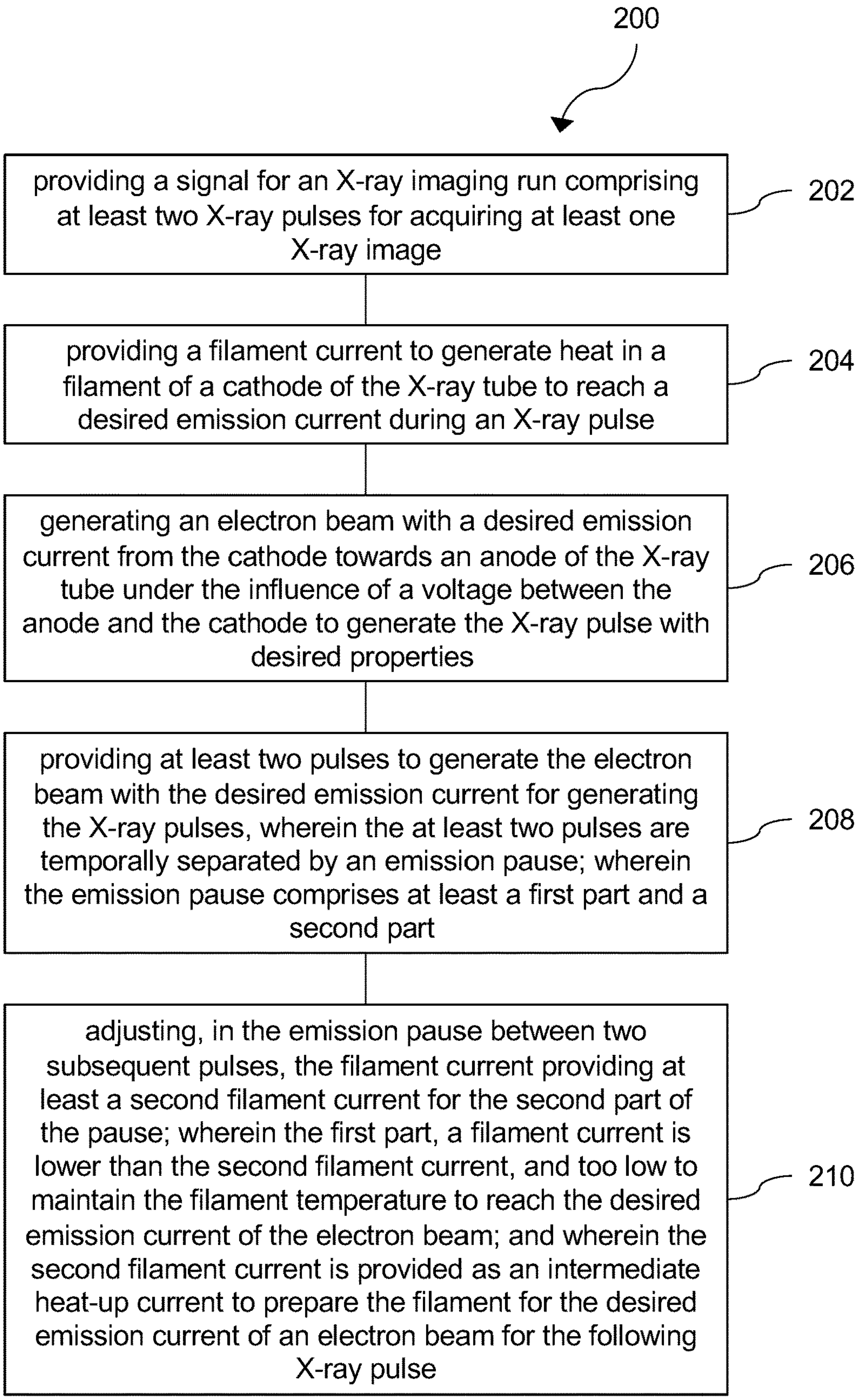
FIG. 4 shows steps of an example of a method for operating a generator of an X-ray tube.

FIG. 4 shows steps of an example of a method 200 for operating a generator of an X-ray tube in a pulsed manner. The method 200 comprises the following steps:

In a first step 202, a signal for an X-ray imaging run is provided comprising a plurality of X-ray pulses for acquiring at least one X-ray image.

In a second step 204, a filament current is provided to generate heat in a filament of a cathode of the X-ray tube to reach a desired emission current during an X-ray pulse.

In a third step 206, an electron beam is generated with a desired emission current from the cathode towards an anode of the X-ray tube under the influence of a voltage between the anode and the cathode to generate the X-ray pulse with desired properties.

For providing the filament current, it is provided the steps of:

In a fourth step 208, a plurality of pulses are provided to generate the electron beam with the desired emission current for generating the plurality of X-ray pulses. Two subsequent pulses of the plurality of pulses are temporally separated by an emission pause; wherein the emission pause comprises at least a first part and a second part.

In a fifth step 210, in the emission pause between the two subsequent pulses, the filament current is adjusted providing at least a second filament current for the second part of the pause.

The first part, a filament current is lower than the second filament current, and too low to maintain the filament temperature to reach the desired emission current of the electron beam.

The second filament current is provided as an intermediate heat-up current to prepare the filament for the desired emission current of an electron beam for the following X-ray pulse.

In an example, the second filament current is provided for the last part of the pause.

In an example, one pulse gives one image. In another example, more than one pulse is provided for a single image. However, the provided intercooler scheme is provided for all variations where pulses are used and at least one pulse pause is provided between two consecutive pulses.

In an example the X-ray pulses are not generated with the purpose of creating images, but for calibrating the imaging system's components or measuring aspects of its performance.

As an example of the method, the first filament current is too low to maintain the filament temperature to reach the desired emission current of the electron beam.

Figure 5:
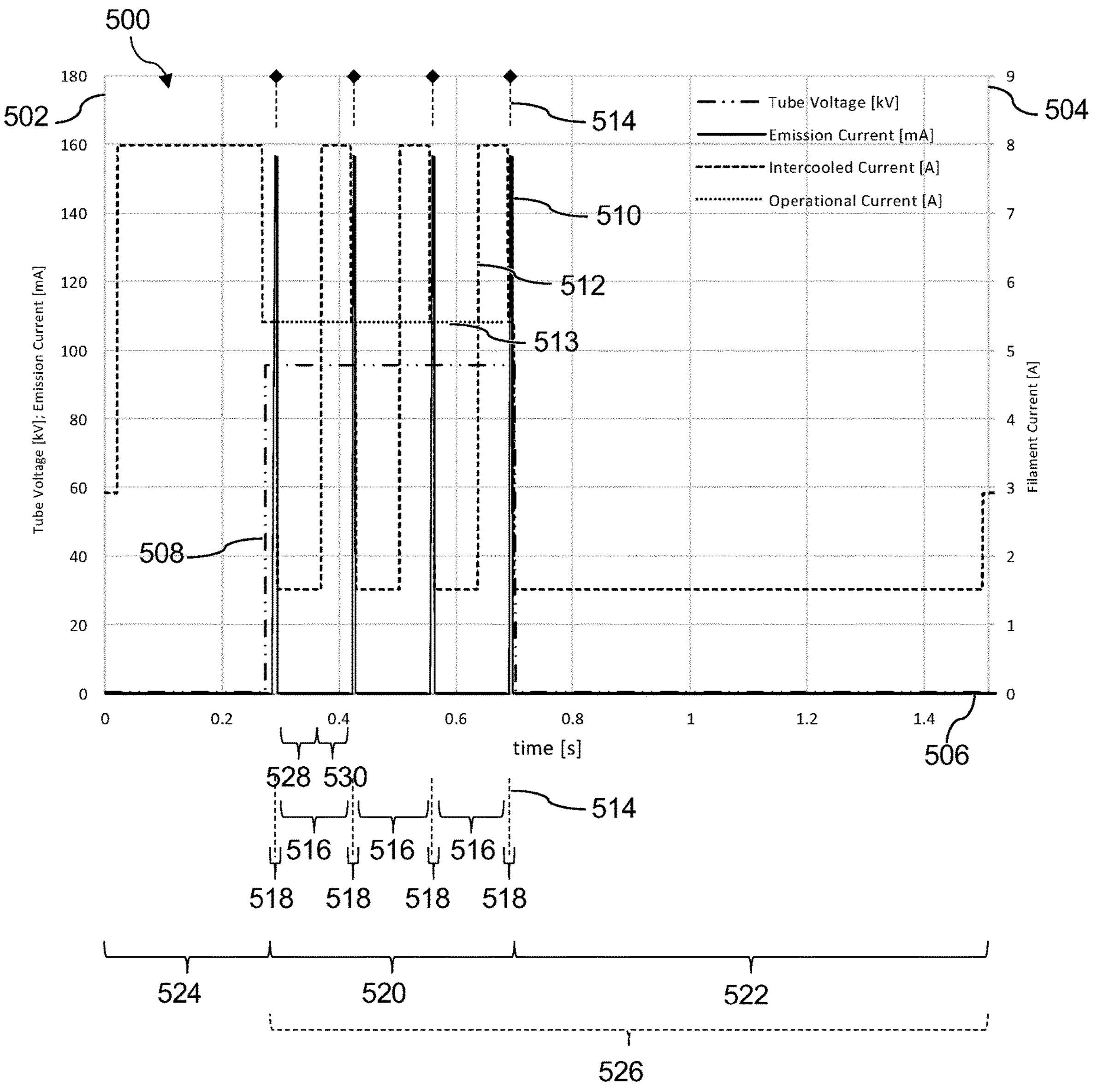
FIG. 5 shows a graph with curves representing different currents and voltages during an exemplary imaging run.

FIG. 5 shows a graph 500 with curves representing different currents and voltages during an exemplary imaging run. A left vertical axis 502 indicates tube voltage and emission current; a right vertical axis 504 indicates filament current. A horizontal axis 506 indicates time. FIG. 5 shows a first curve 508 of a tube voltage and a second curve 510 of an emission current (for better understanding, the curves are shown separately in FIG. 6*a* and FIG. 6*b*). A third curve 512 indicates the intercooled current and a fourth curve 513 (only partly shown) indicates the filament current when the intercooler scheme is not used. It is noted that the filament current follows the intercooled current in a first part before the pulses and in a second part after the pulses. It is also noted that in this case the electric-field restraining device also known as the grid switch is used to create the pulses and the tube voltage is kept at a constant level during the entire run.

Four markers 514 indicate the four X-ray pulses. A pause 516 is provided between the pulses 514. It is noted that the pulse itself has a duration 518. The four X-ray pulses form a sequence of pulses, which is also called a run 520. The run 520 is followed by a blanking period as the first part of a waiting or idle period 522 before the filament current returns to stand-by current. Initially, i.e. before the first pulse of the (first) run, a starting period 524 is provided, in which an initial heating-up of the filament is provided. Before the initial heating-up, a stand-by mode can be provided. The run 520 and the idle period 522 form a clock rate 526 in a plurality of cases runs and idle periods are repeated in a consistent manner.

The pauses 516 between the pulses 514 are shown comprising a first part 528 for the blank phase and a second part 530 for the boost phase.

As an example, the pulses are generated using a grid, e.g. an electric-field restraining device: the voltage remains constant during the run.

In other example, the pulses are generated in other possible ways.

Figure 6A:
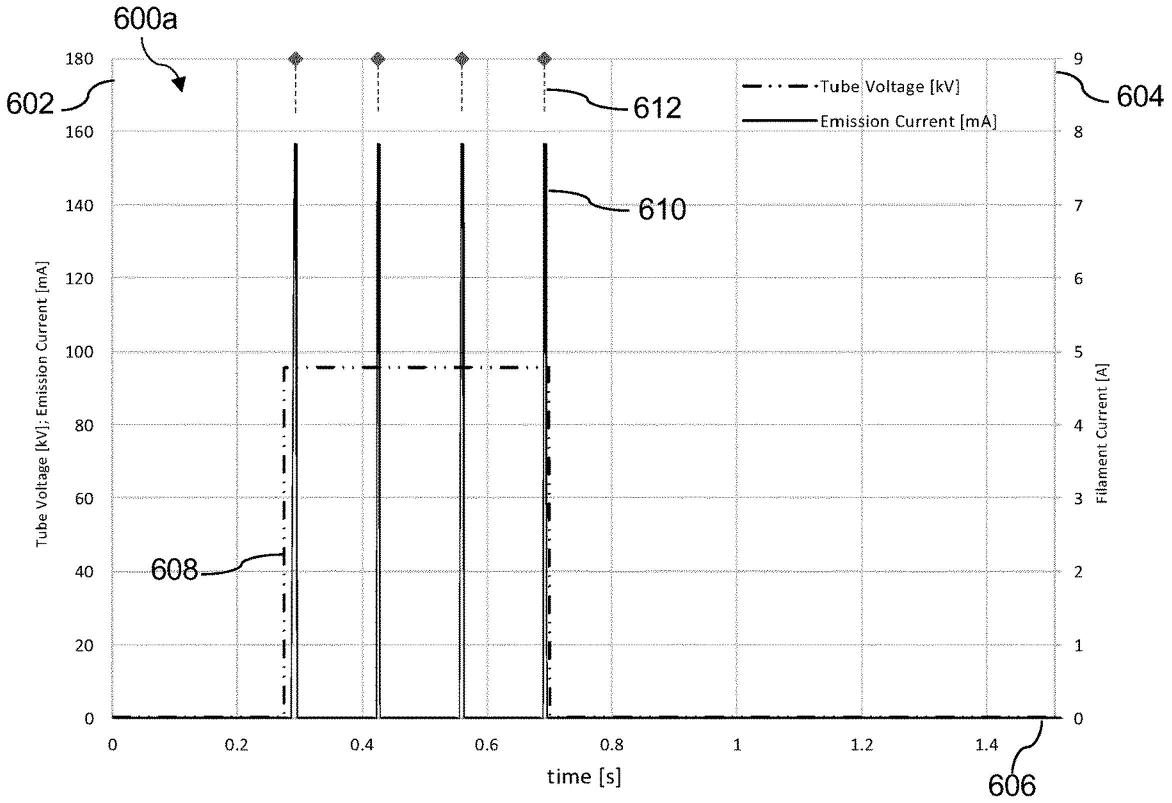
FIG. 6*a* and FIG. 6*b* show the curves of FIG. 5 in separate graphs for better visualization.
Figure 6B:
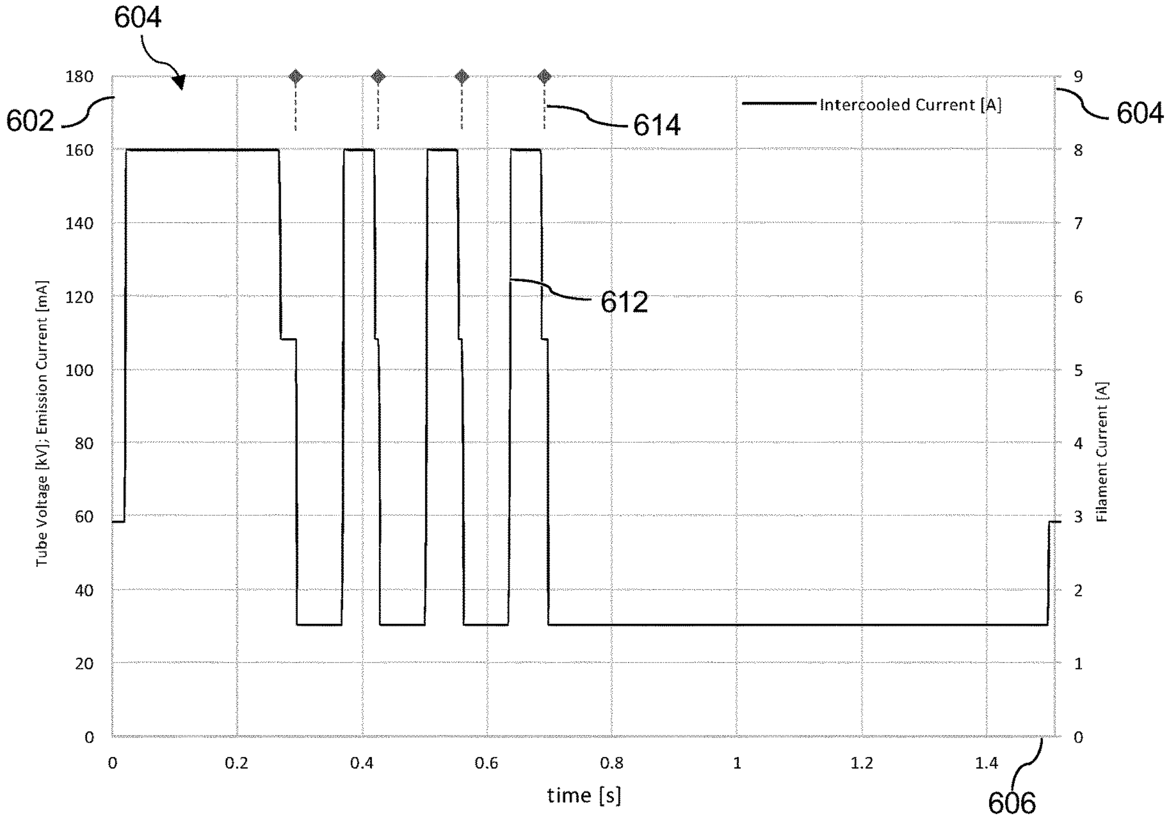

FIG. 6*a* and FIG. 6*b* show the curves of the graph 500 of FIG. 5 in separate graphs 600*a* and 600*b* for better visualization. A left vertical axis 602 indicates tube voltage and emission current; a right vertical axis 604 indicates filament current. A horizontal axis 606 indicates time. FIG. 6*a* shows a first curve 608 of a tube voltage and a second curve 610 of an emission current. Further, a third curve 612 of an intercooler current is indicated in FIG. 6*b*. Four markers 614 indicate the four X-ray pulses. It is noted that the very short, indicated periods at the beginning and the end of the curve 612 indicate the stand-by current, the lowest level indicates the blank current, the highest level indicates the boost level and the four short plateaus between boost and blank level indicate the operational current.

FIG. 7*a*, FIG. 7*b*, FIG. 7*c* and FIG. 7*d* give a graphical illustration of how the duration of the first and the second phase in the pulse pause can be obtained, with a boost curve and a blank curve as an example. A vertical axis 702 indicates filament current. A horizontal axis 704 indicates boost or blank time.

Figure 7A:
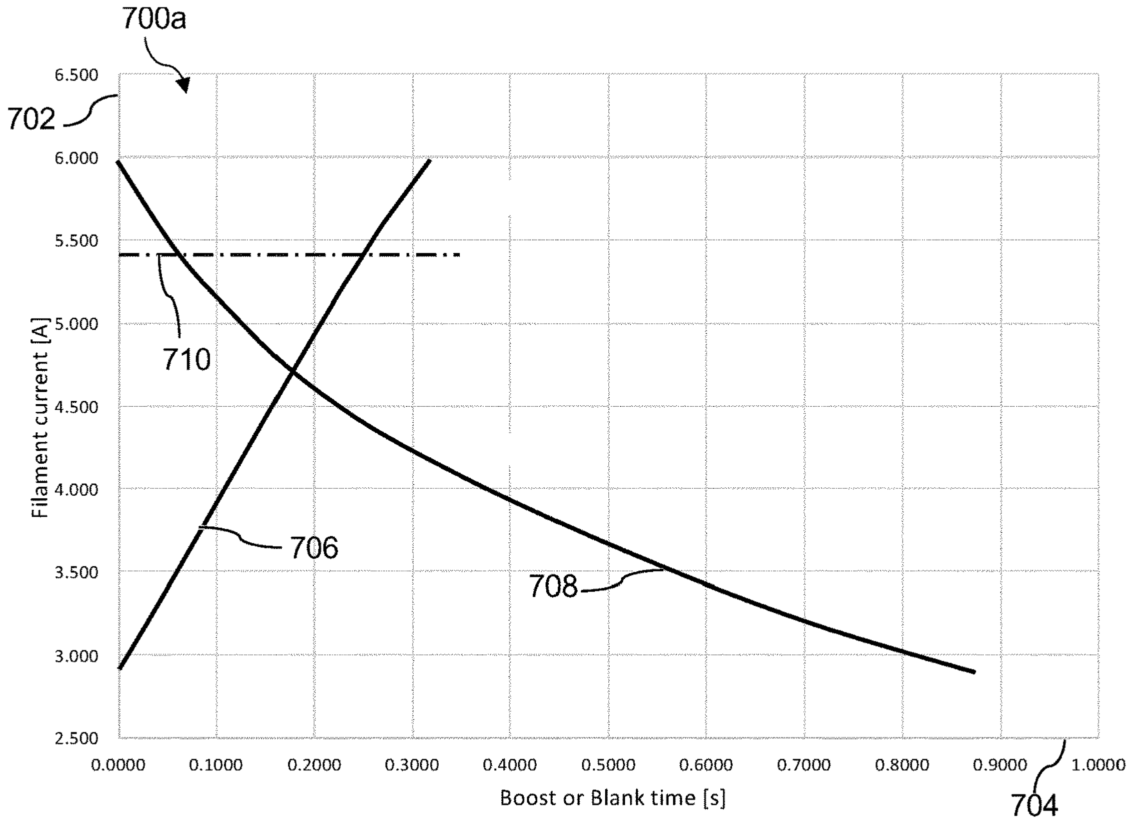
FIG. 7*a*, FIG. 7*b*, FIG. 7*c* and FIG. 7*d* shows graphs with a boost curve and a blank curve as an example for determining the blank and boost time.

FIG. 7*a* shows a first graph 700*a* with a boost curve 706 and a blank curve 708. As a first step, the operational current is determined and identified in the graph, as indicated with hashed line 710.

Figure 7B:
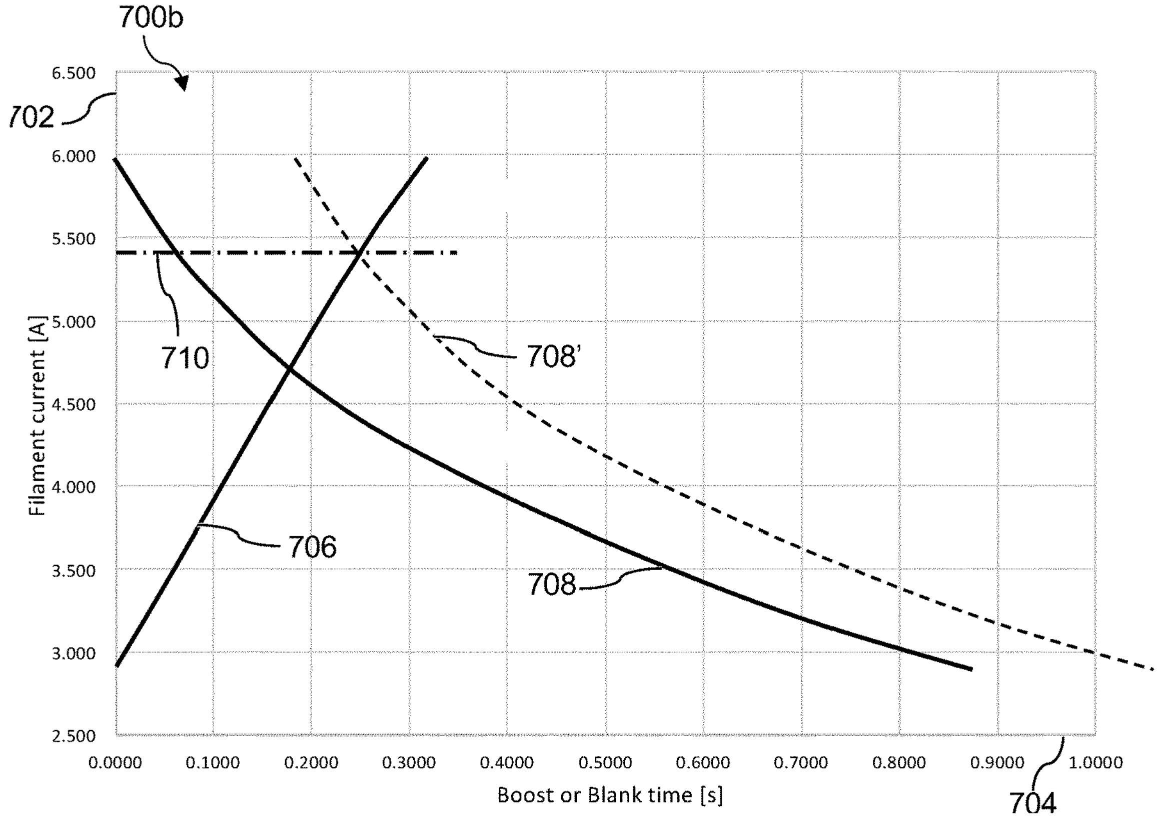
Figure 7C:
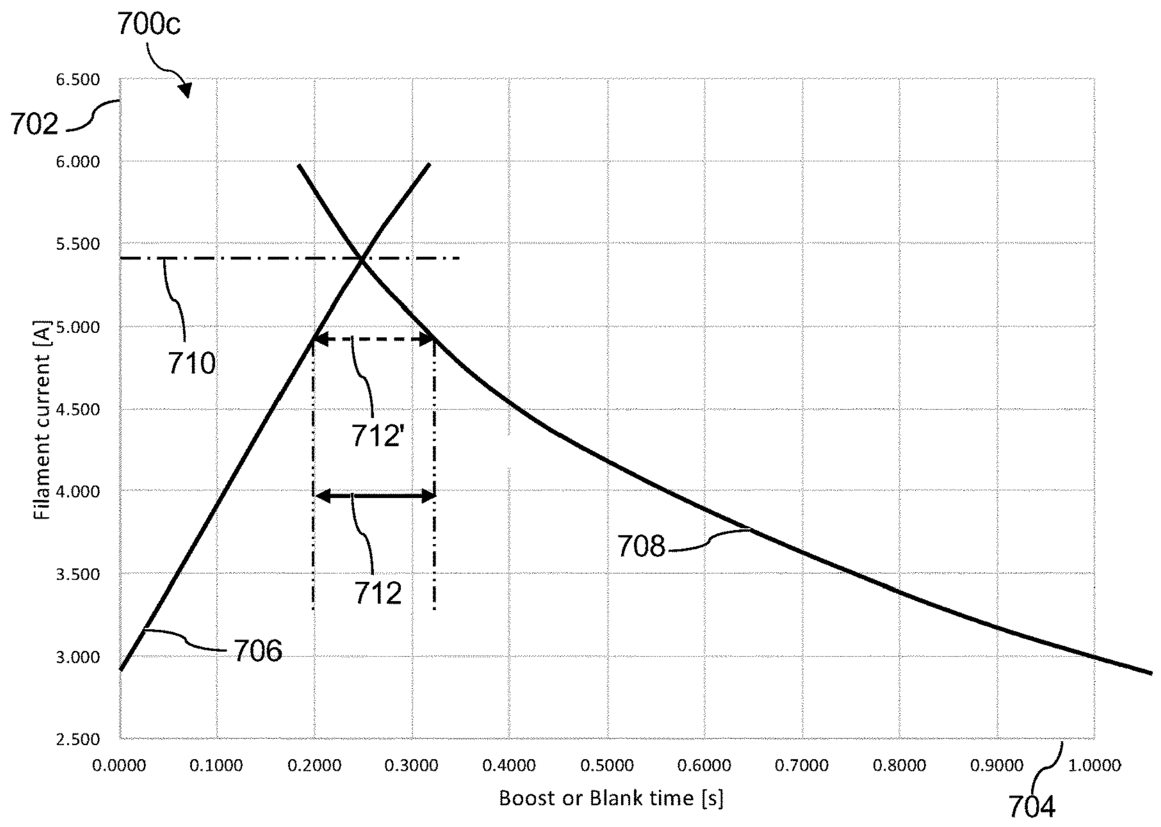

FIG. 7*b* shows a second graph 700*b* with the boost curve 706 and the blank curve 708. As next step, the two curves 706, 708 are virtually moved to cross at the operational current 710. For example, the blank curve 708 is moved to the right, as indicated with hashed line 708'. FIG. 7*c* shows a third graph 700*c* with the boost curve 706 and the blank curve 708. As next step, it is identified where a defined pulse pause 712 (given by the determined pulse rate and pulse width) fits between the curves. For example, the pulse pause 712 is moved upwards, as indicated with hashed line 712'.

Figure 7D:
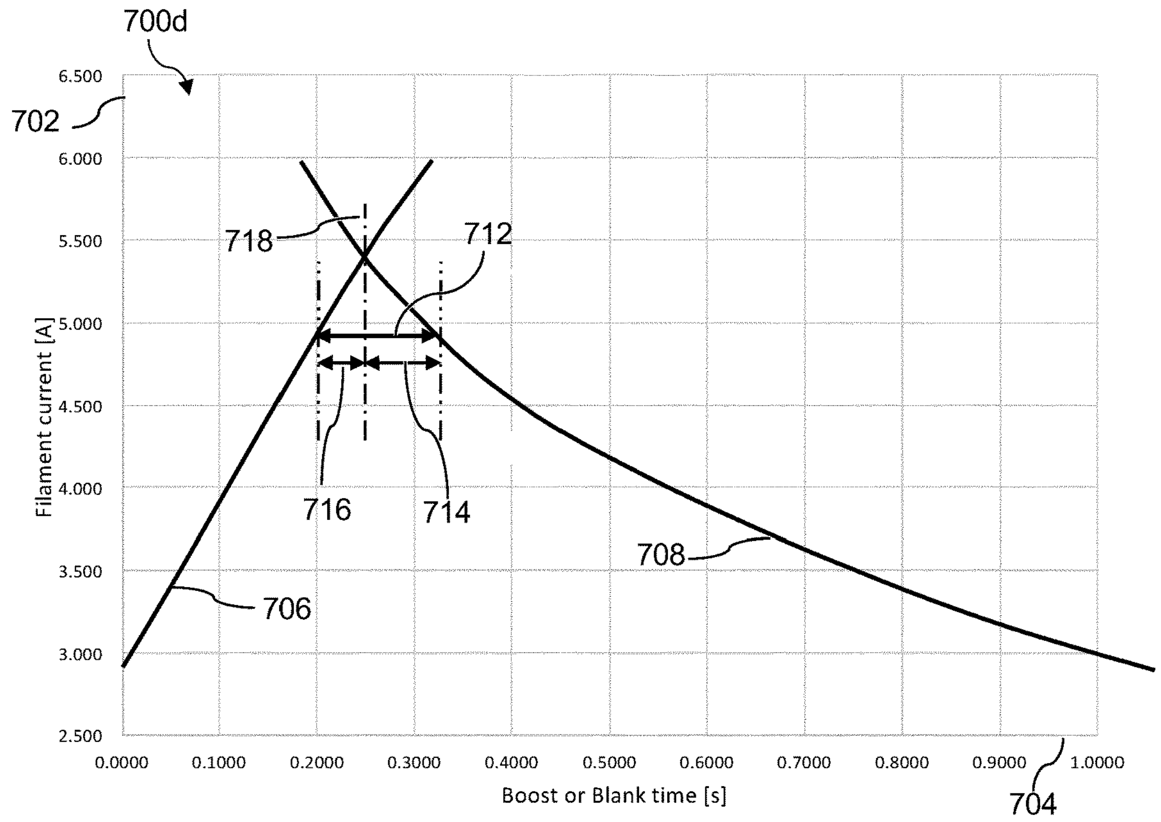

FIG. 7*d* shows a fourth graph 700*d* with the boost curve 706 and the blank curve 708. A blank time 714 and a boost time 716 can be determined by vertically projecting the intersection point, as indicated with hashed line 718.

The shape of the curve segments can be used to calculate the "wear" in the pause.

Figure 8:
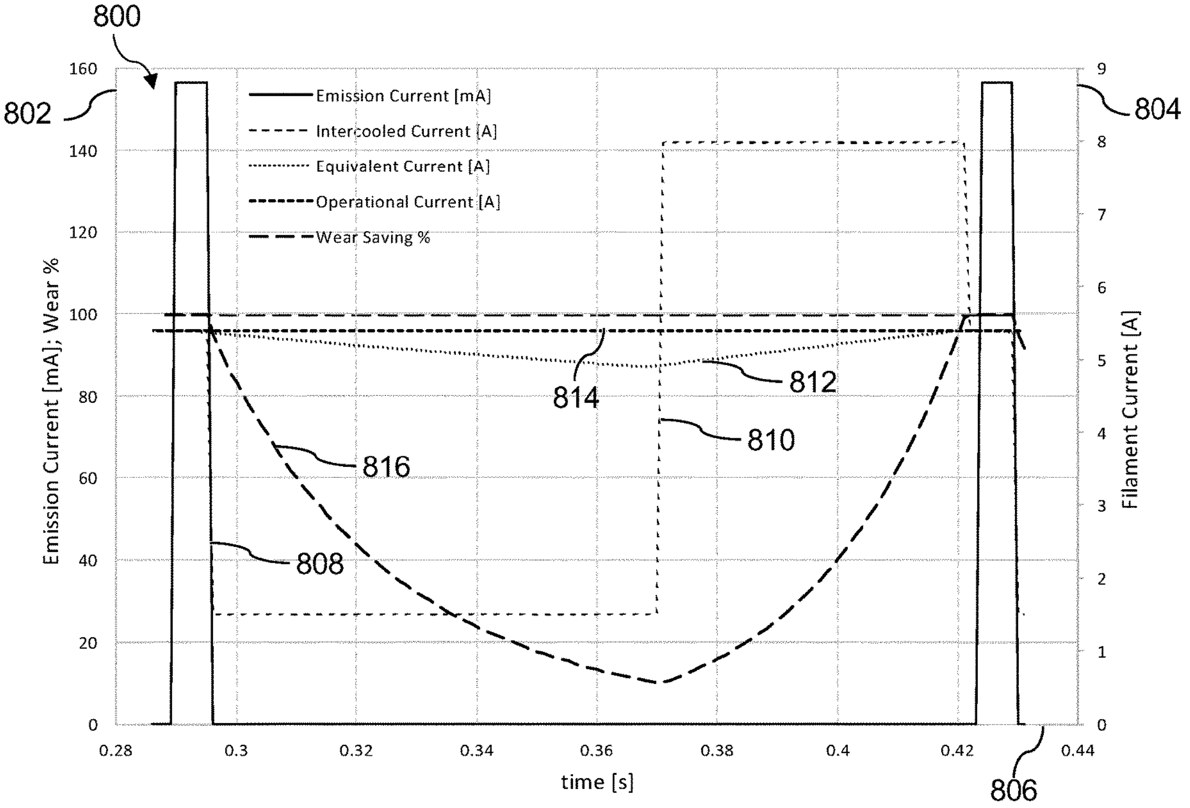
FIG. 8 shows a graph indicating emission current and intercooled current and the estimated saving in wear of an example.

FIG. 8 shows a graph 800 indicating emission current and intercooled current of an example. A left vertical axis 802 indicates emission current and wear. A right vertical axis 804 indicates filament current. A horizontal axis 806 indicates time. A first curve 808 indicates emission current and a second curve 810 indicates intercooled current. A third curve 812 indicates equivalent current (obtained from the blank and boost curve sections), a fourth curve 814 indicates operational current and a fifth curve 816 indicates wear savings.

Assuming that the filament current is kept constant at operational level between pulses, the proposal is to blank and boost between pulses. For the "filament wear", the temperature of the filament would follow blank and boost. Even though this doesn't look like much in current, it means a lot in "wear" savings, e.g. exceeding 20%.

The term "desired properties" relates to the characteristics of the radiation beam, like spectrum/spectra, energy, and duration.

During the pulsed operation of the X-ray system, series of several pulses for imaging can be called runs. Pulses may have a duration (pulse width) in the order of magnitude of about 10 ms and often a pulse rate of 15 pulses per second (pps) is used. X-ray runs may have a duration of about 10 s to a few minutes. With a frame rate of e.g. 15 pps and a pulse width of 10 ms. X-rays are generated only during 15% of the time in an imaging run. The scheme of a first and a second filament current during a sequence of pulses supports that during 15% of the time the filament needs to be at operational temperature. The use of a procedure is proposed in which the filament is cooled down as fast as possible immediately after an X-ray pulse; while the filament is heated up again as fast as possible at the correct time before the next pulse to be just in time to create the next pulse with the correct X-ray settings. The lower temperature between the pulses leads to a significant reduction of tungsten evaporation resulting in a significantly longer tube life.

In an example, the first filament current is provided for a first portion of the pause and the second filament current is provided for a second portion of the pause; and In an option, the first portion is larger than the second portion.

The emission current is a result (function), among others, of the temperature of the filament and the voltage between anode and cathode. The emission current is a property of the electron beam generated between cathode and anode when the cathode has a sufficiently high temperature and the voltage between anode and cathode is high enough.

The filament current is provided for the X-ray tube to generate heat in the filament of the cathode to reach the desired emission current during the X-ray pulse.

The emission current is also referred to as anode current.

The filament current is also referred to as cathode (heating) current.

The first filament current can also be referred to as blank current and is provided during the blank phase.

The second filament current can also be referred to as boost current and is provided during the boost phase.

The first filament current is set to provide the minimum supply for operating the X-ray tube electronic components in idle times between two pulses, but with no, or at least no substantial heating of the filament. In an X-ray tube without such electronic components or in which the components are fed in a different way this current can be 0 A (no current at all). The desired emission is the following emission for generating the next X-ray pulse.

In an example, a boosting of 5-10 A, e.g. 8 A is provided. This results in a high temperature of the filament.

In an example of the method, the application of the first filament current and the second filament current result in a cooling-down and heating-up of the filament during each pause.

The heating up can also be referred to as boosting. In an example, the current is as high as possible, to be as short as possible.

In an example, the application of the first filament current and the second filament current result in a cooling-down and heating-up of the filament during each pause when compared to a filament which is supplied with a constant filament current during the pause, which constant filament current is higher than the first filament current, and which constant filament current is lower than the second filament current In a sequence of pulses, e.g. four pulses, five pulses, six pulses, seven pulses, eight pulses, nine pulses or ten pulses or more pulses, an alternating cooling-down and heating-up procedure of the filament is provided.

In an example of the method, the first filament current is provided for a first portion of the pause and the second filament current is provided for a second portion of the pause. The first portion is larger than the second portion.

In an example, the first filament current is provided for at least 60% of the duration of the pause. For example, the first filament current is provided for at least 75% of the duration of the pause.

In an example, the blanking and boosting periods are based on blank and boost curves. Depending on the situation, this may result in different ratios between blank and boost period. In an example, the blanking takes longer than the boosting. In another example, the boosting takes longer than the blanking.

In an example of the method, the duration of the first portion and the duration of the second portion are determined based on a calculation weighting results from a boost curve and results from a blank curve to retrieve blank time and boost time for a given pulse pause duration.

In an option, the blank and boost times are chosen in such a way that added-up they equal the pulse pause, optionally reduced with a short safety margin. After blanking and boosting for the chosen periods, the temperature of the filament is back at, or at least close to, the temperature required to give the next pulse, corresponding to the operational filament current needed to maintain this temperature. During the pulse, in an option, the operational filament current is provided to drop to the blanking current immediately after the pulse.

In an example, blanking and boosting between X-ray pulses is provided by automatic determination of the first and second portions.

The calculation provides the exact point in time when to switch from blanking to boosting, i.e. from the first filament current to the second filament current.

In an example of the method, the blank curve and the boost curve are taken from provided look-up tables; and the look-up tables are updated based on a detected wear of the filament or the values taken from the table are corrected accordingly.

The correct determination of the point between the pulses to switch from banking to boosting requires sufficient processing capabilities of the generator controller.

In an example of the method, a transition from the second filament current to the operational filament current is provided just before the next X-ray pulse is generated.

In an example of the method, a sequence of pulses is provided for a sequence of images, and each pulse is separated from the preceding/subsequent pulse by an emission pause in which the first filament current and the second filament current are provided consecutively. The sequence of pulses is followed by an idle time before a further imaging sequence is provided.

In an option, at the start of the idle time the filament current is set to blank level equal to the first filament current to allow the temperature to drop to the filament stand-by temperature corresponding to the equilibrium temperature when the filament is heated by the stand-by current after which the stand-by filament current is provided during the remaining idle time, the stand-by filament current is higher than the first filament current.

In an example, for operating an X-ray tube cathode filament, four levels of filament current are provided: a stand-by current, a boost current, an operational current and a blank current. When the X-ray tube is in stand-by mode (ready for operation, but not emitting X-ray), the cathode filament is kept at a temperature that allows for quick heating-up to operational temperature, but that will not lead to thermionic emission when the highest operational voltage is applied between anode and cathode. Preparing for an X-ray acquisition, first the desired settings for tube voltage and emission current are determined. From these two values a setpoint for the operational filament current (adjusted for the filament wear) is determined. The difference between the stand-by current and the operational current is used to determine how long a maximum current (the boost current) needs to be applied to let the filament reach the temperature corresponding to the equilibrium temperature at the operational current. After the boost current is applied for the said period, the filament current switches to operational current. Currently during a run without regulation, the filament current would remain at the operational level until the last pulse of the run is given. After this last pulse, the filament current drops to blank level for a calculated period to cool the filament down to a temperature corresponding to the equilibrium temperature for a filament current at stand-by level, after which the filament current is switched back to stand-by level.

When an acquisition run consists of two or more X-ray pulses, the intercooler becomes relevant. It works by performing blanking and boosting between the pulses. Usually, the pause between two pulses is not long enough to blank to the stand-by temperature and boost back to the operational temperature, so a point somewhere between the two pulses needs to be calculated when to switch from blanking to boosting to be back at operational temperature before the next pulse starts. During the pulse, the filament current is kept at operational level, after which the filament current drops to blanking level again.

If there are long pauses between pulses, it can happen that the pulse pause exceeds the time needed to blank to stand-by temperature and to boost back again to operational temperature. It is possible in such a case to switch the filament current from blanking current to stand-by current and then just in time to boosting current again to avoid for the temperature to drop below the stand-by temperature.

In an example of an X-ray tube, the blank current is not zero, because this current is also used to feed an electronic circuit inside the tube. If this is not needed, in an example, the blank current is set to be zero, i.e. 0 A.

In an option, blank, boost and stand-by current are fixed values, but they are adjusted for the wear of the filament. The operational current is set to obtain the desired emission current at the used tube voltage.

In an example, the blank current is taken as the first filament current, and the boost current is taken as the second filament current.

The term "approximately equal" refers to a deviation of at maximum +/−25% of the values of the current, e.g. maximum +/−10%. In an example, a deviation of maximum +/−5% is provided. In a further example, the first idle filament current is equal to the first filament current.

The acquisition of several images in form of a sequence by several pulses can also be referred to as run or as image run. They are associated with X-ray techniques known as pulsed fluoroscopy, cine, or test-shot lock-in multi-phase.

In an example of the method, a boost filament current is provided before a sequence of pulses is provided. The heat-up filament current can be equal to the second filament current.

In an example, a stand-by current is provided before the image sequence and its pre-heating starts.

The duration time refers to the blank time for the first filament current and the boost time for the second filament current.

It is noted that it is provided to perform boosting and blanking between pulses, in addition to before and after a run.

By performing wear calculations, based on field data of system usage, it is possible to estimate the reduction in wear per run if blanking and boosting are performed between pulses compared to a situation where the filament heating current is kept constant during the run. Wear reduction of around 35% can be achieved. It is also possible to predict wear reduction. This applies for X-ray systems where series of pulses are used and where the wear-out of cathode filaments is a failure mode.

In an example (see also FIG. 5), a fluoroscopy imaging run is provided, for example with a frame rate of 7,5 fps (frames per second). For the tube voltage, a value in the range of 90-100 kV is provided, with a current in the range of 100-200 mA, for example a range of 150-160 mA is provided. As an example, 4 pulses are provided for the run. As an initial boost, a current of between 5-10 A is provided, for example, 8 A, for the duration of 150-300 ms, such as 250 ms. An operational current is determined for 3-8 A, such as 5-6 A, for a duration of 300-500 ms, e.g. 400 ms. Further, a blank current is provided with 1-2 A, e.g. 1,5 A, for a duration of 500-1000 ms, e.g. 800 ms. Between pulses, a blank and boost scheme of two different filament currents is provided. An operational current of 5-6 A is needed, e.g. 5,4 A. The pause between pulses is set to 100-150 ms, e.g. 125 ms, with a safety margin of 1-5 ms, e.g. 3 ms.

A suitable use are X-ray devices, i.e. X-ray tube and X-ray generator, where X-ray radiation is generated in a pulsed mode rather than in a continuous mode. A further suitable use is with X-ray devices for which an adaptation table is continuously kept up-to-date.

In an example of a fixed system, the pulse width (duration of a pulse) may be about 7 ms. A pulse rate of 15 pulses per second (pps) may be used, but also 7,5 pps are possible which makes this application of the blank and boost between pulses even more beneficial. Calculating with 15 pps and 7 ms pulse width, of every second in a run only 15×7=105 ms is filled with X-ray ~10%. The tact of the pulses is $\frac{1}{15}$~67 ms. In this time frame there is a 7 ms pulse leaving 60 ms to blank and boost to reduce the filament temperature and associated wear.

The blank and boost curves (as represented by the blank and boost table) are not symmetrical and can be estimated using a fourth order polynomial. Using the X-ray generator's processing capability, a fictional filament heating current can be found to where the operational filament heating current can drop along the blank curve and climb along the boost curve in the available time (in this case 60 ms) to reach the operational filament heating current again. At the time when this fictional filament heating current is reached, the X-ray generator should switch from blanking to boosting and be back at the required temperature again during the pulse at which the operational filament heating current is applied. If the pause between the pulses is so long that the fictional filament heating current is equal or lower than the stand-by current, the blanking is stopped, and the stand-by current is applied until it is time to start boosting again.

It is necessary for the system to be able to control the use of this algorithm, because, if for instance a variable pulse rate is used (for instance when the pulses are synchronized with the patient's heartbeat) or if the setpoints have not stabilized yet, it is of advantage to be able to switch this algorithm off.

In an example, on the system-generator interface there is provided a general switching on/off instruction that completely enables or disables the intercooler in the generator as a safety measure to completely switch it off if an unexpected issue occurs.

In another example, per run it will be decided in the used EPX (a cluster of settings to optimize the system for the procedure the X-ray run is part of) whether to use or not use the intercooler. For instance, if the X-ray pulses are being synchronized with an external source it may be better to switch the intercooler off. This setting will be ignored when the mechanism is generally switched off.

If an indicator of the generator indicates that the desired set-points are reached and the regulation has settled and if both the general and the EPX related intercooler switch are "on," the intercooler can kick-in.

In an example, a computer program or program element for controlling an apparatus according to one of the examples above is provided, which program or program element, when being executed by a processing unit, is adapted to perform the method steps of one of the method examples above.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit or be distributed over more than one computer units, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A control device for pulsed operation of a generator for an X-ray tube, the control device comprising:
   a processor in communication with memory, the processor configured to:
   provide a signal for an X-ray imaging run comprising a plurality of X-ray pulses for acquiring at least one X-ray image;
   control the generator to provide a filament current to generate heat in a filament of a cathode of the X-ray tube to reach a desired emission current during an X-ray pulse,
   control the generator to provide the plurality of X-ray pulses, each two subsequent X-ray pulses of the plurality of X-ray pulses temporally separated by an emission pause, the emission pause comprising at least a first part and a second part; and
   adjust the filament current in the emission pause between the two subsequent pulses, providing a first filament current for the first part of the pause and a second filament current for the second part of the pause, the first filament current being lower than the second filament current.

2. The control device according to claim 1, wherein the processor is configured to provide the filament current at an operational level during an X-ray pulse and wherein the first filament current is lower than the operational level and the second filament current is higher than the operational level.

3. The control device according to claim 1, wherein the processor is configured to control the generator such that the first filament current and the second filament current result are repeatedly applied during at least a part of the emission pauses between subsequent pulses of the plurality of X-ray pulses.

4. The control device according to claim 1, wherein the processor is configured to control the generator such that the duration of the first portion and the duration of the second portion are determined based on a calculation weighting results from a boost curve and results from a blank curve to retrieve blank time and boost time for a given pulse pause duration while still reaching the operational filament temperature during the pulses.

5. The control device according to claim 1, wherein the processor is configured to control the generator such that the blank curve and the boost curve are interpolated from look-up tables.

6. The control device according to claim 5, wherein the look-up tables are updated based on a detected wear of the filament; and
   wherein the results from the look-up table are corrected for the detected wear of the filament.

7. The control device according to claim 1, wherein, to generate the electron beam with the desired emission current for generating the X-ray pulses, the processor is configured to control the generator to provide a plurality of voltage pulses corresponding to the X-ray pulses.

8. The control device according to claim 1, wherein the processor is configured to control the generator such that after the second filament current, an operational filament current is provided during the pulse.

9. The control device according to claim 1, wherein the processor is configured to control the generator such that a heat-up filament current is provided before a sequence of pulses is provided; and
   wherein the heat-up filament current is equal to the second filament current.

10. The control device according to claim 1, wherein the processor is configured to control the generator such that a filament current during the first part of the pause is sufficient to provide that a predetermined minimal filament current is maintained as effective current throughout the pause.

11. A generator for pulsed voltage supply of an X-ray tube, the generator comprising:
   the control device according to claim 1;
   an electric power input connectable to an electric power supply configured to provide an input in form of electric energy for operating the X-ray tube, wherein the electric power supply is connected to the electric transformer arrangement;
   an electric transformer arrangement is configured to transform the electric input into suitable DC high-voltage and suitable electric current for pulsed operation of the X-ray tube; and
   wherein an electric power output is configured to provide the suitable high-voltage and the suitable electric currents, wherein the electric power output is connectable to the X-ray tube,
   wherein the control device is configured to control said generator components.

12. An X-ray imaging system, comprising:
   an X-ray tube for generating X-ray radiation;
   a control device according to claim 1; and
   a generator for voltage and current supply of the X-ray tube;
   wherein the X-ray tube comprises an anode and a cathode;
   wherein the cathode comprises at least one cathode filament for emitting at least one electron beam towards the anode; and
   wherein the control device controls a pulsed operation of the cathode filament by controlling the electric transformer arrangement of the generator.

13. A method for operating a generator of an X-ray tube in a pulsed manner, the method comprising:
   providing a signal for an X-ray imaging run comprising a plurality of X-ray pulses for acquiring at least one X-ray image;
   providing a filament current to generate heat in a filament of a cathode of the X-ray tube to reach a desired emission current during an X-ray pulse;
   generating an electron beam with a desired emission current from the cathode towards an anode of the X-ray tube under the influence of a voltage between the anode and the cathode to generate the plurality of X-ray pulse with desired properties;
   providing a plurality of pulses to generate the electron beam with the desired emission current for generating the plurality of X-ray pulses, wherein each two subsequent pulses of the plurality of X-ray pulses are temporally separated by an emission pause; wherein the emission pause comprises at least a first part and a second part; and
   adjusting, in the emission pause between the two subsequent pulses, the filament current thereby providing a first filament current for the first part of the pause and a second filament current for the second part of the pause,
   wherein the first filament current is lower than the second filament current.

14. The method according to claim 13, further comprising providing the filament current at an operational level during an X-ray pulse and wherein the first filament current is lower than the operational level and the second filament current is higher than the operational level.

15. The method according to claim 13, further comprising controlling the generator such that the first filament current and the second filament current result are repeatedly applied during at least a part of the emission pauses between subsequent pulses of the plurality of X-ray pulses.

16. The method according to claim 13, further comprising controlling the generator such that the duration of the first portion and the duration of the second portion are determined based on a calculation weighting results from a boost curve and results from a blank curve to retrieve blank time and boost time for a given pulse pause duration while still reaching the operational filament temperature during the pulses.

17. A non-transitory computer readable medium having stored a computer program comprising instructions which, when executed by a processor, cause the processor to:

provide a signal for an X-ray imaging run comprising a plurality of X-ray pulses for acquiring at least one X-ray image;

control the generator to provide a filament current to generate heat in a filament of a cathode of the X-ray tube to reach a desired emission current during an X-ray pulse, control the generator to provide the plurality of X-ray pulses, each two subsequent X-ray pulses of the plurality of X-ray pulses temporally separated by an emission pause, the emission pause comprising at least a first part and a second part; and adjust the filament current in the emission pause between the two subsequent pulses, providing a first filament current for the first part of the pause and a second filament current for the second part of the pause, the first filament current being lower than the second filament current.

18. The non-transitory computer readable medium according to claim 17, wherein the instruction, when executed by the processor, further cause the processor to provide the filament current at an operational level during an X-ray pulse and wherein the first filament current is lower than the operational level and the second filament current is higher than the operational level.

19. The non-transitory computer readable medium according to claim 17, wherein the instruction, when executed by the processor, further cause the processor to control the generator such that the first filament current and the second filament current result are repeatedly applied during at least a part of the emission pauses between subsequent pulses of the plurality of X-ray pulses.

20. The non-transitory computer readable medium according to claim 17, wherein the instruction, when executed by the processor, further cause the processor to control the generator such that the duration of the first portion and the duration of the second portion are determined based on a calculation weighting results from a boost curve and results from a blank curve to retrieve blank time and boost time for a given pulse pause duration while still reaching the operational filament temperature during the pulses.

* * * * *